United States Patent [19]
Jun

[11] Patent Number: 6,046,760
[45] Date of Patent: Apr. 4, 2000

[54] SET TOP BOARD FOR VIDEO ON DEMAND SERVICE AND A COMPUTER SYSTEM MOUNTING THE SAME

[75] Inventor: Dae-Hyun Jun, Kyungki-Do, Rep. of Korea

[73] Assignee: SamSung Electronics Co., Ltd., Kyungki-do, Rep. of Korea

[21] Appl. No.: 08/852,067

[22] Filed: May 6, 1997

[30] Foreign Application Priority Data

May 6, 1996 [KR] Rep. of Korea ...................... 96-14682

[51] Int. Cl.$^7$ ...................................................... H04N 7/10
[52] U.S. Cl. .............................. 348/7; 345/327; 348/10; 709/219
[58] Field of Search .................................. 348/7, 10, 12, 348/13; 345/327, 328; 709/217, 218, 215; 455/4.2

[56] References Cited

U.S. PATENT DOCUMENTS

| | | |
|---|---|---|
| 5,359,367 | 10/1994 | Stockill . |
| 5,416,508 | 5/1995 | Sakuma et al. . |
| 5,442,390 | 8/1995 | Hooper et al. . |
| 5,461,667 | 10/1995 | Reillard . |
| 5,512,935 | 4/1996 | Majeti et al. . |
| 5,523,781 | 6/1996 | Brusaw . |
| 5,541,662 | 7/1996 | Adams et al. . |
| 5,557,675 | 9/1996 | Schupak . |
| 5,592,234 | 1/1997 | Gardner et al. . |
| 5,594,491 | 1/1997 | Hodge et al. . |
| 5,594,492 | 1/1997 | O'Callaghan et al. . |
| 5,594,507 | 1/1997 | Hoarty . |
| 5,619,250 | 4/1997 | McClellan et al. ........................ 348/10 |
| 5,621,482 | 4/1997 | Gardner et al. . |
| 5,678,012 | 10/1997 | Kimmich ................................ 345/328 |
| 5,850,340 | 12/1998 | York ....................................... 364/188 |

*Primary Examiner*—Victor R. Kostak
*Attorney, Agent, or Firm*—Robert E. Bushnell, Esq.

[57] ABSTRACT

A set top board which is mounted within a personal computer in the form of a card, such as a video card and a communications card, includes: a networking part for communicating with a service provider of the VOD service system; an interface for interfacing with the CPU of the personal computer so that the set top board can be controlled by control signals of the personal computer; a decoder for decoding compressed MPEG image data, and a video processor for processing and outputting data corresponding to the compressed MPEG image data programs as still images on a monitor of the personal computer.

8 Claims, 9 Drawing Sheets

SET TOP BOARD FOR VIDEO ON DEMAND SERVICE AND A COMPUTER SYSTEM MOUNTING THE SAME

CLAIM OF PRIORITY

This application makes reference to, incorporates the same herein, and claims all benefits accruing under 35 U.S.C. §119 from an application for A SET TOP BOARD FOR VIDEO ON DEMAND SERVICE AND A COMPUTER SYSTEM MOUNTING THE SAME earlier filed in the Korean Industrial Property Office on May 6, 1996 and there duly assigned Ser. No. 12807/1996, a copy of which application is annexed hereto.

BACKGROUND OF THE INVENTION

1. Field of the Invention

The present invention is generally directed to a set top board for activating video on demand (VOD) service. More particularly, this invention relates to a set top board which can be mounted in a slot of a personal computer and can provide the VOD service program on a monitor or the personal computer as visible and audible signals for the computer user, and to a computer system comprising such a set top board.

2. Description of Related Art

Video on demand (hereinafter, referred to as "VOD") service means a service system in which subscribers or customers can interactively choose various programs stored in a video source and can watch a program they desire at any time, rather than just receiving preset TV programs from broadcasting stations. The VOD subscriber can manipulate the selected program, as the user of VCR, including replay, rewinding, pause, and recording of the served video program. Moreover, various video and audio services such as video games, home shopping and video conferencing can be offered to the users in the VOD service system. In view of this expansion of the serviced extent, VOD service is also called an interactive TV service, or called video dial tone service in that telephone companies may participate in the video market.

In order to realize the VOD service, a user's terminal, such as TV receiver, needs to have an interfacing means for transferring the selected video program signal to the server and for decoding or recovering compressed video data transmitted from the server in response to the selected program signal. Recently, so called "set top boxes" have generally been used as the interfacing means in an interactive TV receiver.

An earlier VOD service system, which was normally placed on top of the television receiver, interfaces a television set with a server which can compress, store, and manage a large amount of data for servicing desired TV programs to customers. A T1 network communicates interactively but asymmetrically the video data between the server and a set top box (STB). The T1 network can downstream transfer image data at a high speed while upstream transfers data at a low speed. The STB receives and processes VOD service data from the server via the T1 network and transfers image data to the TV receiver. The TV receiver is provided with a display for showing to subscribers VOD service items and image data corresponding to the selected service item transmitted via the STB. The STB may be operated via a remote controller utilizing the display of the TV receiver.

The STB normally includes a power supply, a remote controller signal receiver for receiving and decoding the command signals from the remote controller, a T1 networking part for communicating with the server of the VOD service system via the T1 network, video processor for processing the list of the service items transferred in the form of image data into still images, an MPEG (motion picture experts group) decoder for recovering original video data from compressed MPEG data which is transmitted from the server and corresponds to a particular service item selected by the user, a video encoder for receiving the recovered data from the MPEG decoder and for transferring the received data to the TV as picture data and an audio processor for processing audio data contained in the VOD service program. A central processing unit CPU of the STB controls the above components.

The server stores data, such as movies, games and educational programs, necessary to service data corresponding to the service item for the subscribers and interactively transfers data when connected to the STB via the T1 network.

The server transmits a list showing the service program items to the STB in the form of image data and the STB passes the list from the server to the TV receiver in a still image format.

The user chooses an item to be serviced from the list displayed on the screen of the TV receiver and then transfers information as to the selected item back to the server. The server transfers compressed MPEG image data corresponding to the selected item to the STB via the T1 network. The STB recovers the received MPEG data and transfers the recovered image data to the TV receiver which displays the selected VOD service.

Such an STB has the following disadvantages.

Firstly, the STB must be connected to a TV receiver in order to receive image data serviced from the VOD service system.

Secondly, due to the first defect of the STB, when a user want to save, edit, or fast forward or rewind a certain motion picture, a multi-media personal computer, having an overlay board which can receive and process image data of the motion picture, is needed. In this case, digital image data received by the TV receiver must be transformed to analog data and the analog data must again converted into digital data to be saved or edited as the user wants. As a result, data may be lost in the data conversion steps.

The Schupak patent, U.S. Pat. No. 5,557,675, entitled Computer Controller Audio-Visual System, discloses an arrangement in which a computer directly interfaces an audio/video signal with one or more television receivers. However, there is no indication that the system is operative with an interactive video on demand service as in the present invention.

The Hodge et al. patent, U.S. Pat. No. 5,594,491, entitled Near-Video-On Demand Digital Video Distribution system Utilizing Asymmetric Digital Subscriber Lines, discloses a video on demand distribution system utilizing a set top box but does not teach or suggest the use of a set top box contained in a card within a personal computer as in the present invention.

The Remillard, U.S. Pat. No. 5,461,667, entitled Apparatus And Method For Electronic Device For Information Services, discloses an arrangement in which an electronic device 20, which appears to be a special purpose computer, is disposed between a television 50 and a communication medium 32. While the Remillard '667 system has interactive capability, Remillard '667 does not teach or suggest a set top board for a video on demand service contained within a card within a personal computer as in the present invention.

The following patents each disclose features in common with the present invention but do not teach or suggest a set top board for a video on demand system contained within a card mounted within a personal computer as in the present invention.

U.S. Pat. No. 5,512,935 to Majeti et al., entitled Apparatus And Method For Displaying An alert To An Individual Personal Computer User Via The User's Television Connected To A Cable Television System, U.S. Pat. No. 5,442,390 to Hooper et al., entitled Video On Demand With Memory Accessing And Or Like Functions, U.S. Pat. No. 5,416,508 to Sakuma et al., entitled CATV system With Transmission Of Program Schedules, Linked Program Broadcasts, And Permissive Ordering Periods, U.S. Pat. No. 5,359,367 to Stockill, entitled Personal Computer With Broadcast Receiver On Expansion Board Controlled By Computer Microprocessor, U.S. Pat. No. 5,541,662 to Adams et al., entitled Content Programmer Control Of Video And Data Display Using Associated Data, U.S. Pat. No. 5,523,781 to Brusaw, entitled System For Controlling Television And Billing for Its Use, U.S. Pat. No. 5,621,482 to Gardner et al., entitled Interface System For A Television Receiver, U.S. Pat. No. 5,592,234 to Gardner et al., entitled Interface System For A Television Receiver, U.S. Pat. No. 5,594,492 to O'Callaghan et al., entitled Method And Apparatus For Rapid Channel Selection, and U.S. Pat. No. 5,594,507 to Hoarty, entitled Compressed Digital Overlay Controller And Method For MPEG Type Video Signal.

SUMMARY OF THE INVENTION

It is an object of the present invention to provide a new set top board for the VOD service system, which can be controlled by a reset signal of a personal computer and which is in the form of an independent card.

It is another object of the present invention to provide a new set top board for the VOD service system, which can display VOD image data to a monitor of a PC under the control of the PC.

It is still another object of the present invention to provide a new set top board for the VOD service system, which can be mounted in the form of a card in a slot of a PC and which has been simplified by eliminating several components of the earlier STB having functions included in those of the PC, e.g., components such as a power supply, a remote controller signal receiver, a video encoder and an audio signal processor.

It is still another object of the present invention to provide a personal computer which can be employed in VOD service system by mounting a set top board as a card therein.

According to an aspect of the present invention, a set top board is used in a VOD service system for providing a plurality of compressed MPEG image data programs and is used in a personal computer provided with a CPU for controlling the personal computer, a plurality of slots for mounting a number of functional cards, a display for displaying video signals, and a speaker for outputting audio signals. The set top board comprises a networking means for communicating with a service provider of the VOD service system; an interface for interfacing with said CPU of the personal computer so that said set top board can be controlled by control signals of the personal computer; a decoder for decoding said compressed MPEG image data; and a video processor for processing and outputting data corresponding to said compressed MPEG image data programs as still images on a monitor of the personal computer.

According to a further aspect of the present invention, a set top board which is mounted within a personal computer, and is applied to a VOD service system for providing a plurality of compressed MPEG image data programs, comprises a CPU for controlling an operation of the set top board; a T1 networking part for communicating with a VOD service provider; a video processor for processing lists corresponding the compressed image data programs transmitted from the VOD service provider via the T1 networking part into a still image; a MPEG decoder for decoding and recovering the compressed image data corresponding to a predetermined VOD program; a PC interface for receiving a clock signal CK from ISA control logic and a reset signal RESET(PC) from the personal computer, and for sending a reset signal RESET(STB) used for enabling predetermined components to operate with a CPU of the set top board, said T1 networking part, said video processor, and said MPEG decoder; a video adapter for outputting video signals contained in the data decoded by said MPEG decoder to the personal computer; an audio adapter for outputting audio signals contained in the data decoded by said MPEG decoder to the personal computer.

According to another aspect of the present invention, a computer system comprises a CPU for controlling operations of the computer system, via a PC remote controller signal receiver for receiving messages sent from a user of the computer system by a PC remote controller; a motherboard provided with a number of slots and for mounting said CPU thereon; a set top board for selectively performing a VOD function by interfacing the computer system with a VOD provider or a video CD function, said set top board being mounted in a respective one of the number of slots and being controlled by control signals transferred from the CPU; a video/audio signal processor for manipulating video signals and audio signals from the set top board; and a display for displaying image data sent from the set top board via the video/audio signal processor.

These and other features, and advantages, will be more clearly understood from the following detailed description taken in conjunction with the accompanying drawings. It is important to point out that the illustrations may not necessarily be drawn to scale, and that there may be other embodiments of the present invention which are not specifically illustrated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF PREFERRED EMBODIMENTS

Figure 1:
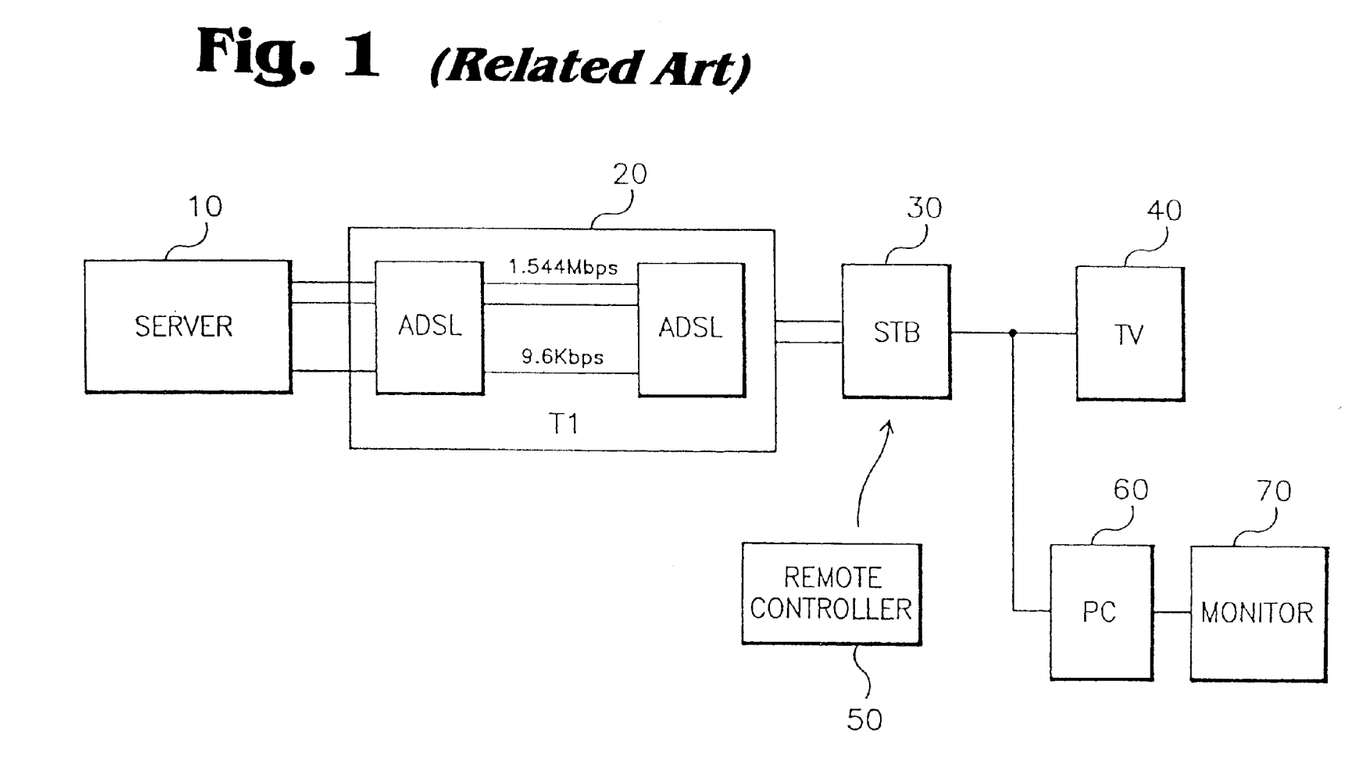
FIG. 1 is a schematic block diagram of an earlier VOD service system.

FIG. 1 is a schematic block diagram of VOD service system. A server 10 can compress, store and manage a large amount of image data for servicing desired TV programs to customers. A T1 network 20 communicates interactively but asymmetrically the video data between the server 10 and STB (set top box) 30. The T1 network 20 consists of two ADSLs (asymmetric digital subscriber lines) and transmission cables. The ADSL is, like hybrid fiber coax or fiber in the loop, one of the access lines for an interactive service, and is asymmetrical in that a master ADSL connected to the server 10 can downstream transfer the image data at a high speed while a slave ADSL associated with the STB 30 upstream transfers data at a low speed. The STB 30 receives and processes VOD service data from the server 10 via the T1 network 20, and transfers image data to a TV receiver 40. The TV receiver 40 is provided with a display for showing to subscribers VOD service items and image data corresponding to the selected service item transmitted via the STB 30. The STB 30 is powered on and initialized by receiving commands from users via a remote controller 50. The remote controller 50 enable the users to select wanted items from VOD service items shown in the display of the TV receiver 40.

Figure 2:
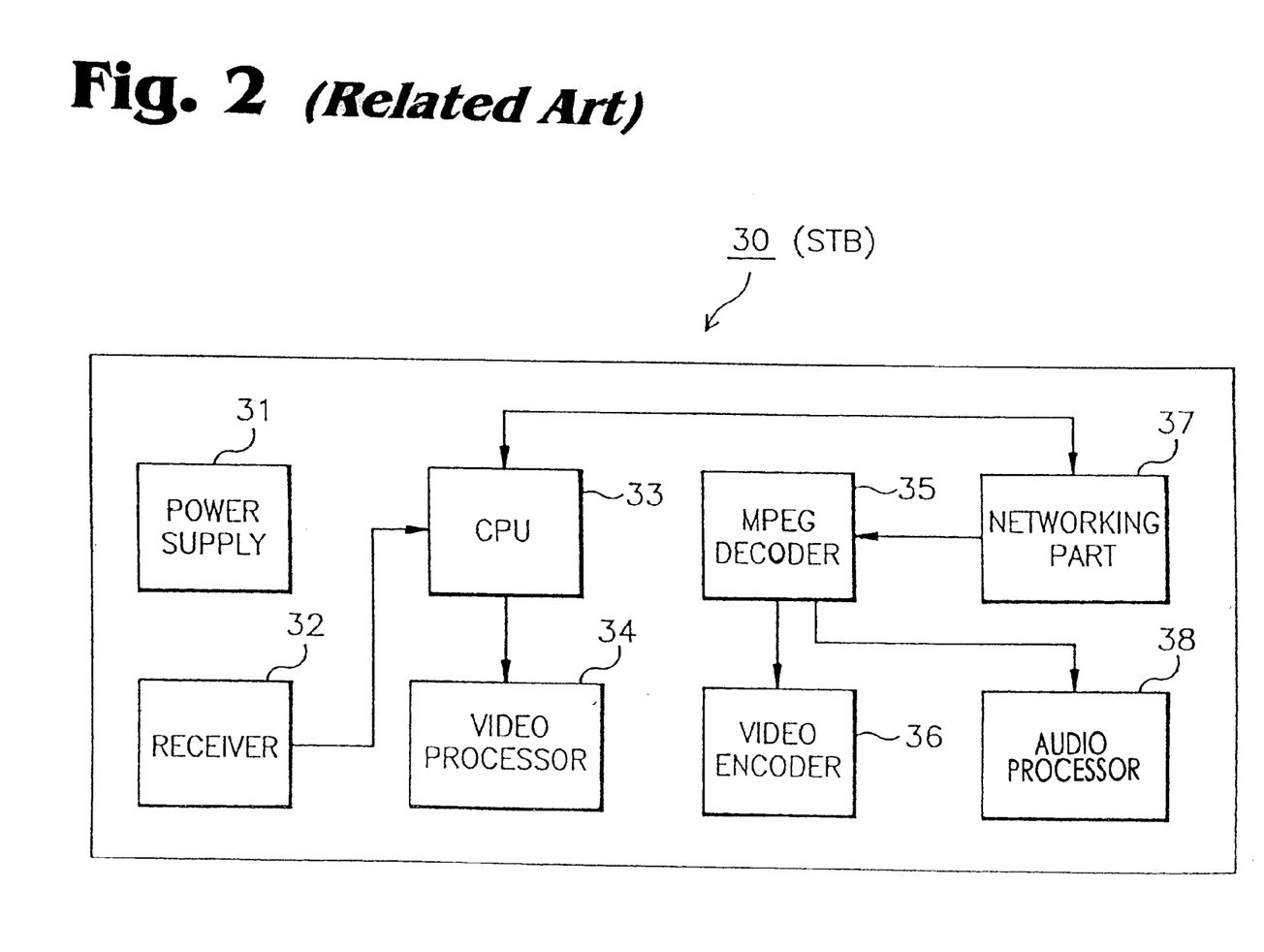
FIG. 2 is a schematic block diagram of the set top box used in the VOD service system of FIG. 1.

FIG. 2 is a schematic block diagram of the set top box used in the VOD service system of FIG. 1. The set top box comprises a power supply 31 for providing 5V or 12V power for the components of the set top box 30, remote controller signal receiver 32 for receiving and decoding the command signals from the remote controller 50, T1 networking part 37 for communicating with the server 10 of the VOD service system via the slave ADSL of the T1 network 20, video processor 34 for processing the list of the service items transferred in the form of image data into still images, an MPEG (Motion Picture Experts Group) decoder 35 for recovering original video data from compressed MPEG data which is transmitted from the server 10 and corresponds to a particular service item selected by the user, a video encoder 36 for receiving the recovered data from the MPEG decoder 35 and for transferring the received data to the TV 40 as picture data, and an audio processor 38 for processing audio data contained in the VOD service program. A central processing unit (CPU) 33 of the STB 30 controls the above components, and the remote controller 32 is a microcomputer.

The operation of the VOD service system is detailed explained in detail below, referring to FIGS. 1 and 2.

The server 10 stores data such as movies, games and education programs necessary to service data corresponding to the service item for the subscribers, and interactively transfers data connected to the STB 30 via the T1 network 20. When a user turns on the power supply 31 of the STB 30 using the remote controller 50, a processor having a real time operating system within the STB 30 initializes all components of the STB so that the STB can be connected to the server 10 via the T1 network 20 and can transmit the user's messages to the server 10.

The server 10 transmits a list showing the service program items to the STB 30 in the form of image data, and the STB 30 passes the list from the server 30 to the TV receiver 40 in a still image format.

The user chooses, by using the remote controller 50, an item which he or she wants to be serviced from the list displayed on the screen of the TV receiver 40, and then transfers information as to the selected item back to the server 10. The server 10 transfers compressed MPEG image data corresponding to the selected item to the STB 30 via the T1 network 20. The compressed MPEG data is transferred at a speed of, e.g., 1.544 Mbps from the server 10 to the STB 30. The STB 30 recovers the received MPEG data and transfers the recovered image data to the TV receiver, which displays the selected VOD service.

Figure 3:
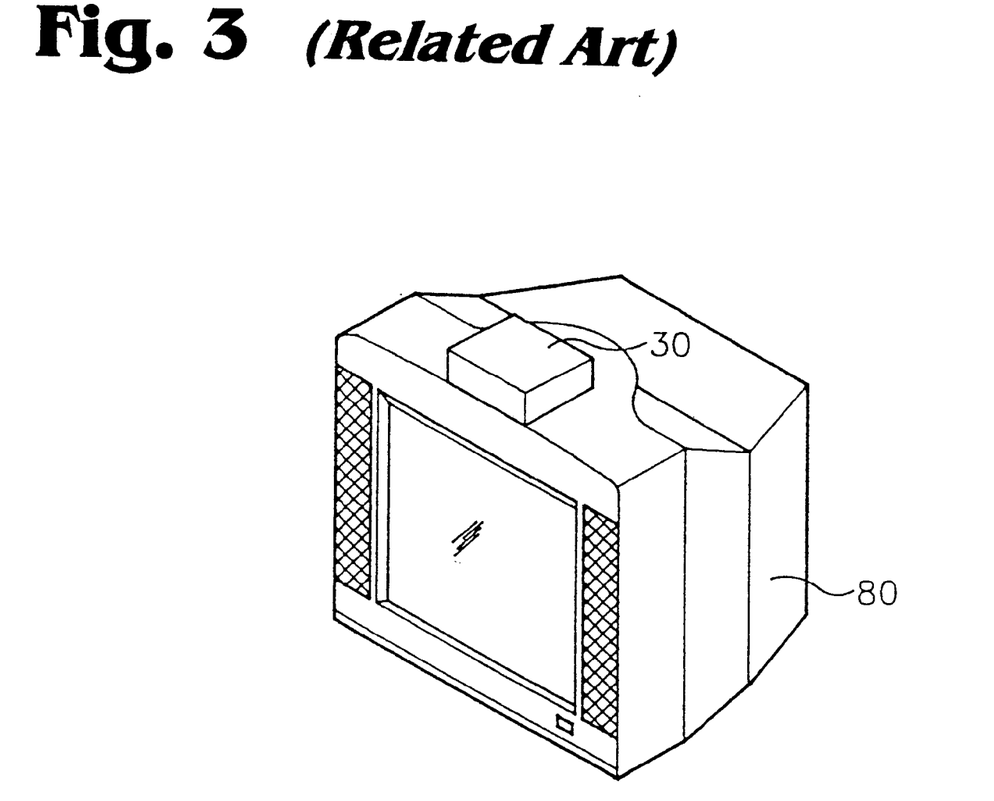
FIG. 3 shows an example of mounting of the VOD set top box of FIG. 2.

The STB is, as shown in FIG. 3, additionally set on top of the display apparatus 80 in order to interface the VOD server and the apparatus. However, such an STB has some disadvantages as listed below.

First, the STB must be connected to a TV receiver in order to receive image data serviced from the VOD server system.

Second, due to the first defect of the STB, when a user want to save, edit or fast forward or rewind a certain motion picture, a multi-media personal computer 60, having an overlay board which can receive and process image data of the motion picture, is needed. In this case, digital image data received by the TV receiver must be transformed to analog data, and the analog data must again be converted into digital data to be saved or edited as the user wants. As a result, data may be lost in the data conversion.

Figure 4:
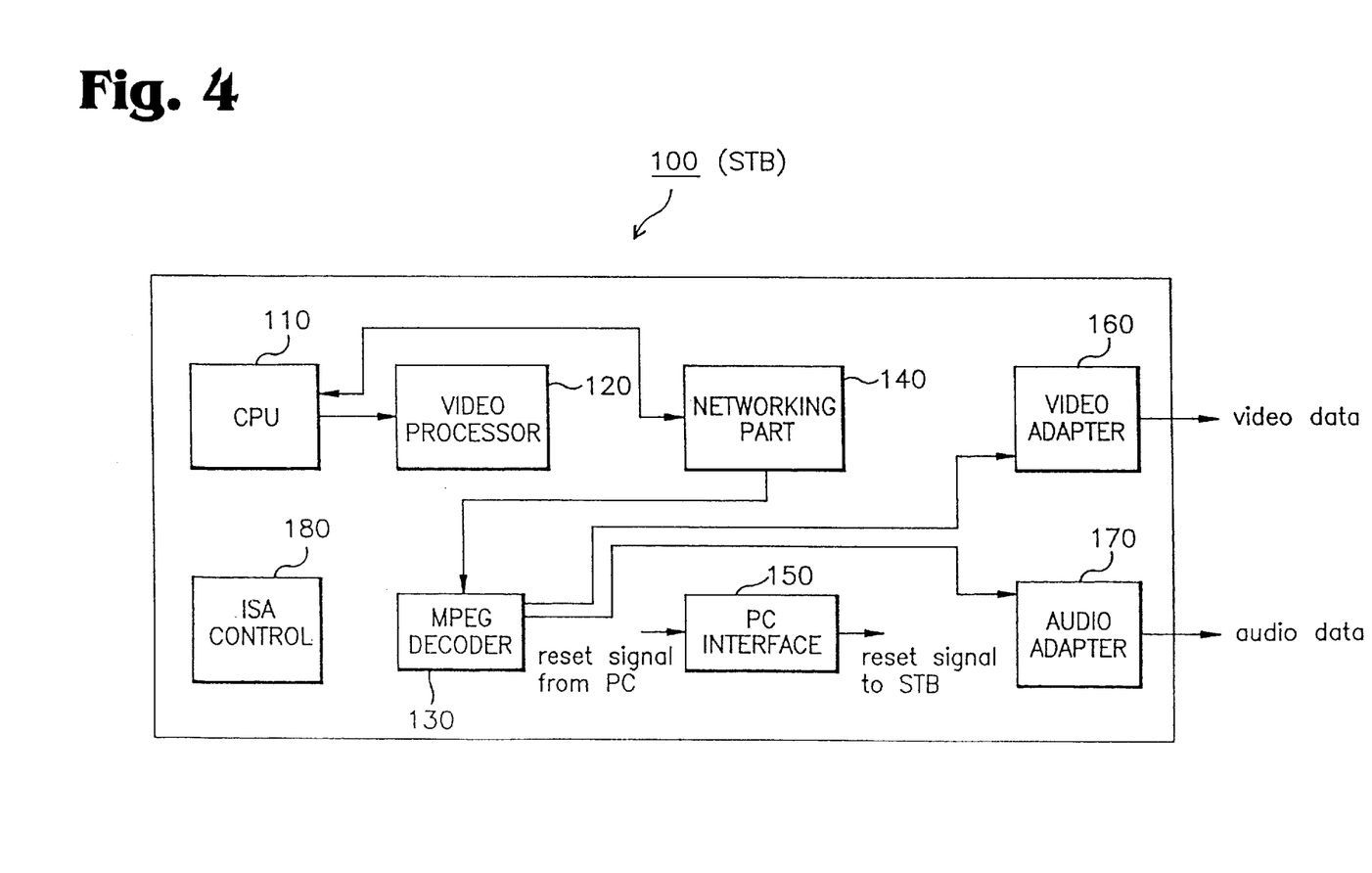
FIG. 4 is a schematic diagram for showing the construction of the set top board according to an embodiment of this invention.

With the present invention, a set top board 100 of FIG. 4 is mounted in a regular personal computer so that the PC can selectively enable component elements of the set top board corresponding to video CD and VOD service functions under the control of the PC itself. As a result, a user of the PC can choose whether pictures of a video CD are to be displayed on a monitor of his PC or whether VOD images are to be displayed.

FIG. 4 is a schematic diagram for showing the construction of the set top board according to an embodiment of this invention. The set top board 100 is, like a video card or an I/O card, plugged into a slot of the PC so that some components contained in the earlier set top box can be eliminated, resulting in a compact set top board.

The set top board 100 is provided with a video processor 120 for manipulating lists of the serviced items from the server 10 and for converting the lists to a still image, an MPEG decoder 130 for recovering the compressed MPEG data corresponding to a requested VOD service program being transmitted through a T1 networking part 140 from the server 10, the T1 networking part 140 for communicating with the server 10 of the VOD service system, a PC interface 150 for receiving a reset signal from a PC and for outputting the reset signal so that when video CD is to be used, components of the set top board associated with the operation of the video CD can be enabled and when a VOD program is to be serviced, corresponding components can be enabled, a video adapter 160 for video signals contained in the recovered data by the MPEG decoder 130, an audio adapter 170 for audio signals in the recovered data by the MPEG decoder 130, and an ISA control logic 180.

Comparing the set top board 100 according to this invention shown in FIG. 4 with the STB 30 of FIG. 2, it is understandable that the power supply 31, the remote controller signal receiver 32, the video encoder 36 and the audio processor 38 which are contained in the STB 30 can be eliminated due to the fact that the set top board 100 is mounted within the PC and the above components of the STB are common to some elements of the PC. That is to say, the set top board 100 is much more simple than the STB 30.

Figure 9:
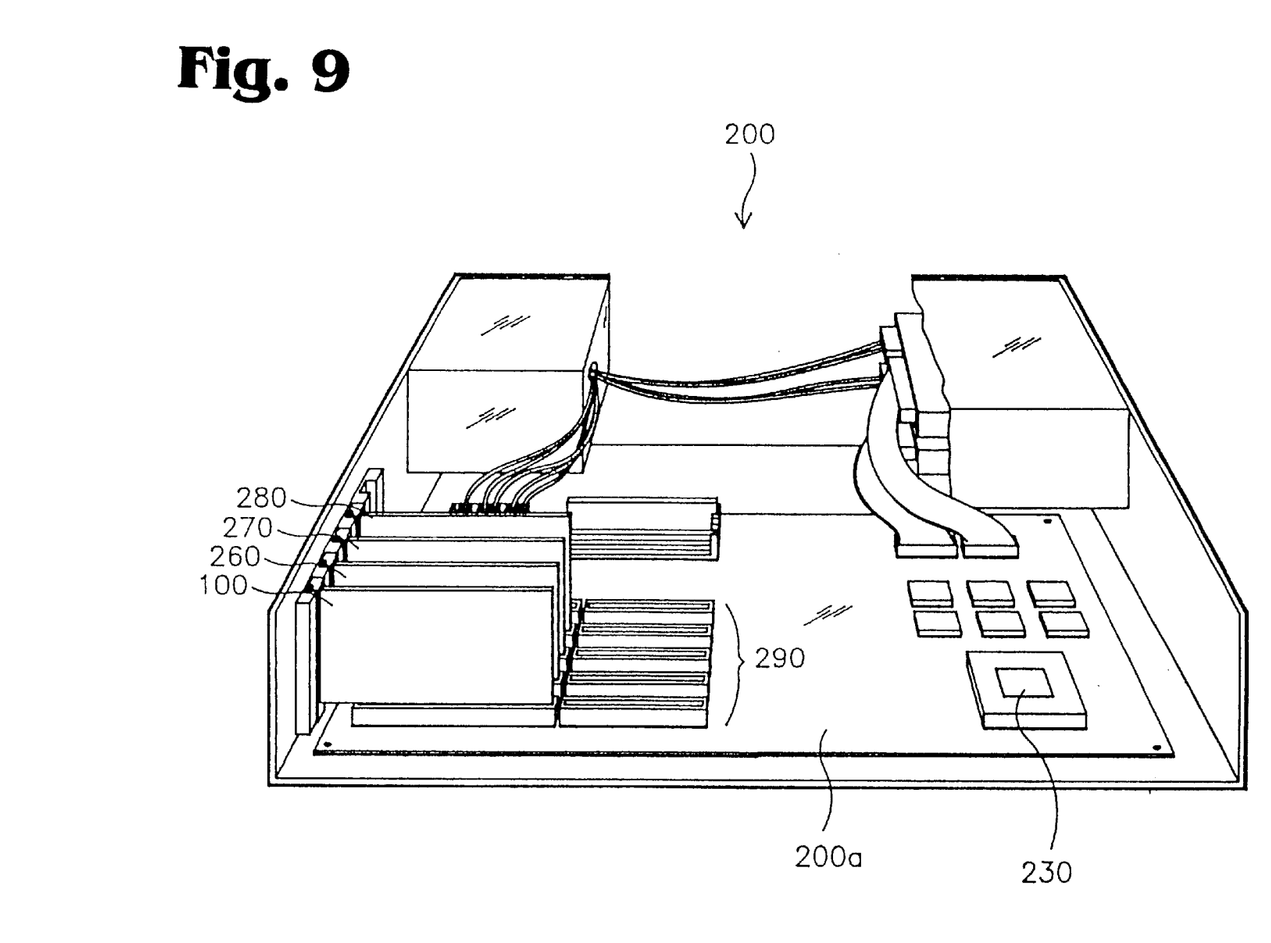
FIG. 9 shows an example of the set top board according to the present invention which is mounted in a slot of a personal computer.

In practice, the set top board 100 is plugged into one of a plurality of slots 290 in PC 200 together with a communication card 280, a video card 260 and an audio card 270 as shown in FIG. 9. Digital data for video and audio produced by the set top board are converted through the video card 280 and the audio card 260 into analog data which are then output on a monitor and a speaker as visible and audible signals.

Figure 5:
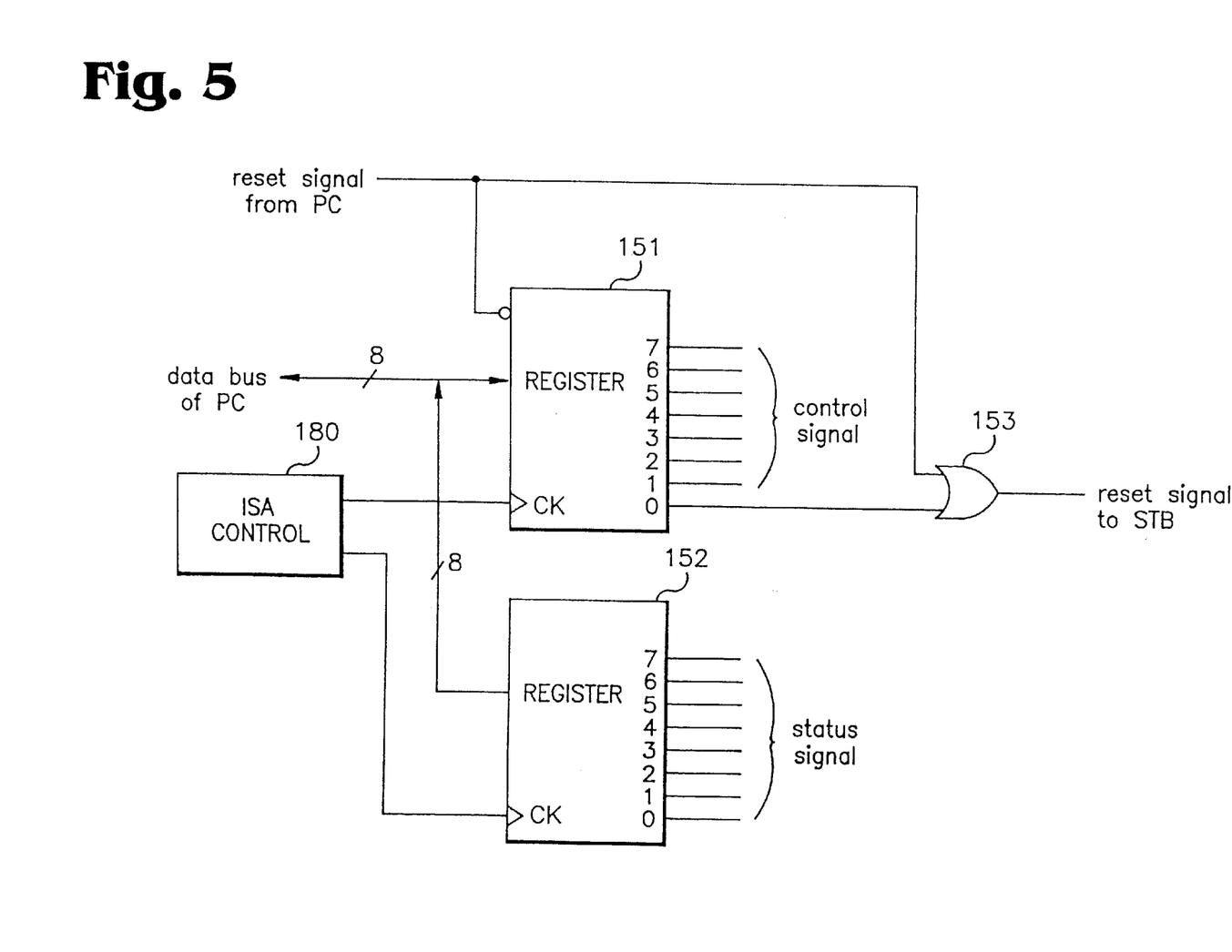
FIG. 5 shows an embodiment of PC interface 150 of FIG. 4.

FIG. 5 shows an embodiment of the PC interface 150 of FIG. 4. Referring to FIG. 4, a register 151 receives a clock signal CK from the ISA control logic 180, and a reset signal RESET(PC) is from the CPU of a PC. A least significant bit 0 of the register output is set to '1', and bits 1 to 7 are for controlling the other components of the set top board when data are incoming through the data bus of the PC 200. Another register 152 also receives its clock signal CK from the ISA control logic 180, and its data input from the data bus. The output bits 0 to 7 of this register 152 comprise status signals. A two input OR gate 153 receives its inputs from the bit 0 of the register 151 and from the reset signal RESET(PC), and outputs a reset signal for the set top board RESET(STB).

As explained above, when the reset signal RESET(PC) is sent to the PC interface 150 of the set top board 100 from the CPU of the PC 200, the reset signal RESET(STB) for resetting components of the set top board 100 is produced by the register 151 which can interface with the CPU. In other words, it is possible to change the reset and operation conditions of the components of the set top board by making use of a software program. Further, data transfer is carried out through the data bus of the PC, and interfacing of the set top board and the PC is possible by checking out the status signals output from the register 152.

Referring to FIG. 5, when the reset signal RESET(PC) is output from the CPU of the PC, the least significant bit 0 of the register 151 is set to a "1". Then, the OR gate 153, which receives its two inputs from the reset signal RESET(PC) and the least significant bit 0 of the register 151, outputs a logically high reset signal RESET(STB) so that components of the set top board can be reset. This is identical to the condition where the power of the earlier set top box is turned on by the remote controller, and the CPU 110 within the set top board 100 is initialized and starts its normal operations.

On the contrary, when the least significant bit 0 of the register 151 is a "0", a low leveled reset signal RESET(STB) is output from the OR gate 153. Accordingly, components of the set top board are disabled, which is identical to the condition in which the earlier set top box is turned off.

Figure 6:
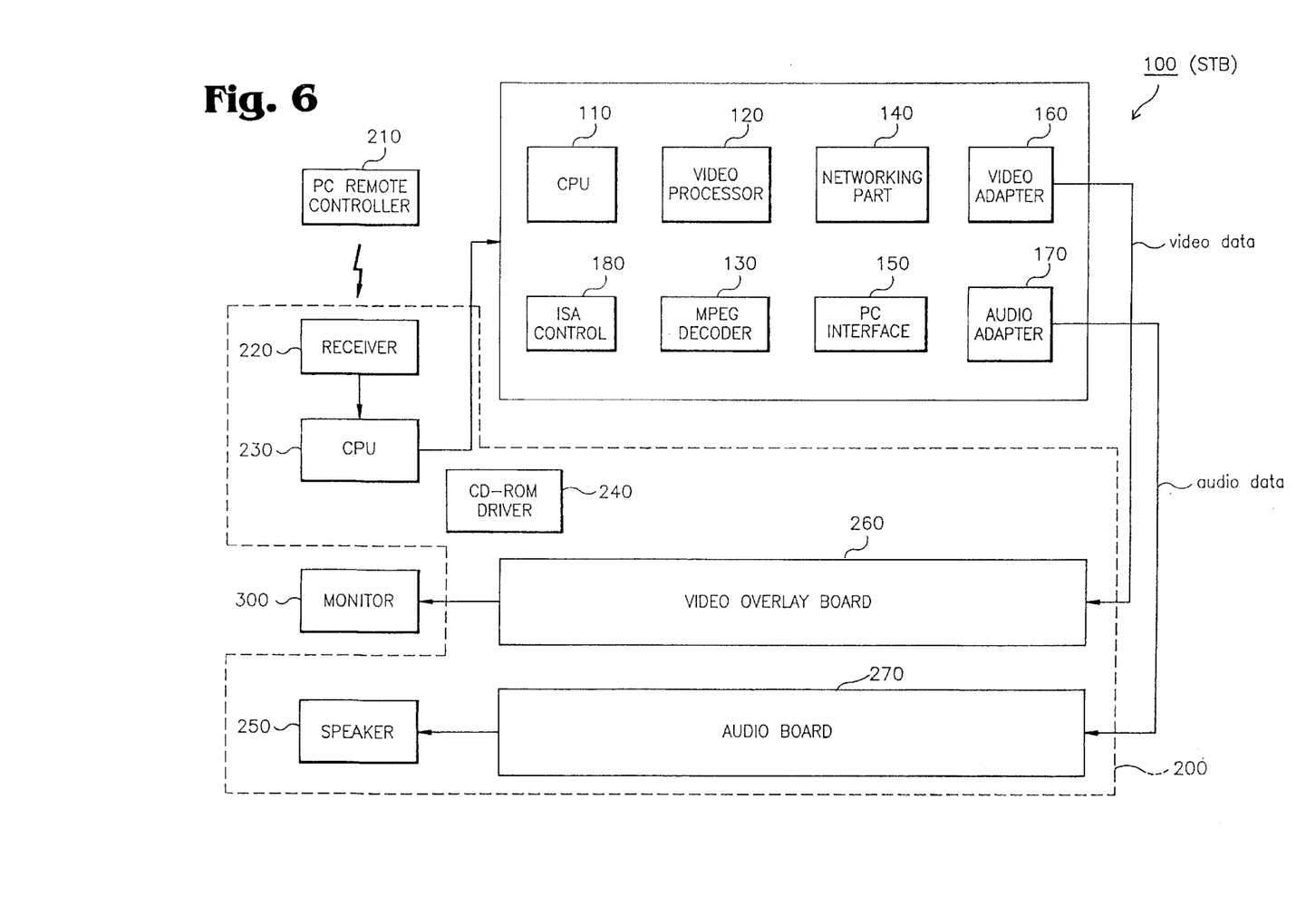
FIG. 6 shows a construction of a personal computer in which a set top board of the present invention is mounted.

FIG. 6 shows a construction of a personal computer in which a set top board of the present invention is mounted. Digital video signals associated with the VOD service which is output from the set top board 100 is, by a video overlay board 260, converted into analog video signals and displayed on a monitor 300. On the other hands, audio signals are processed by an audio board 270, and sent to a speaker 250. Users or VOD subscribers can see and hear the VOD programs by the monitor 300 and the speaker 250.

When MPEG data from the video CD-ROM driver 240 of the PC 200 is recovered by the MPEG decoder 130 and re-transferred to the PC 200 via the video overlay board 260, users can view the recovered analog data displayed on the computer monitor.

Rather than the earlier TV enabling VOD service to be produced by the additional set top box, the set top board 100 according to the present invention is mounted within the PC 200 in the form of a board which can be plugged into a slot of the PC 200 so that the VOD service can be controlled by a software program or applications, and multi-functions can be added to the VOD service.

The video overlay board 260 and the audio board 270 are plugged into respective slots 290 of the PC 200 as shown in FIG. 9.

Figure 7:
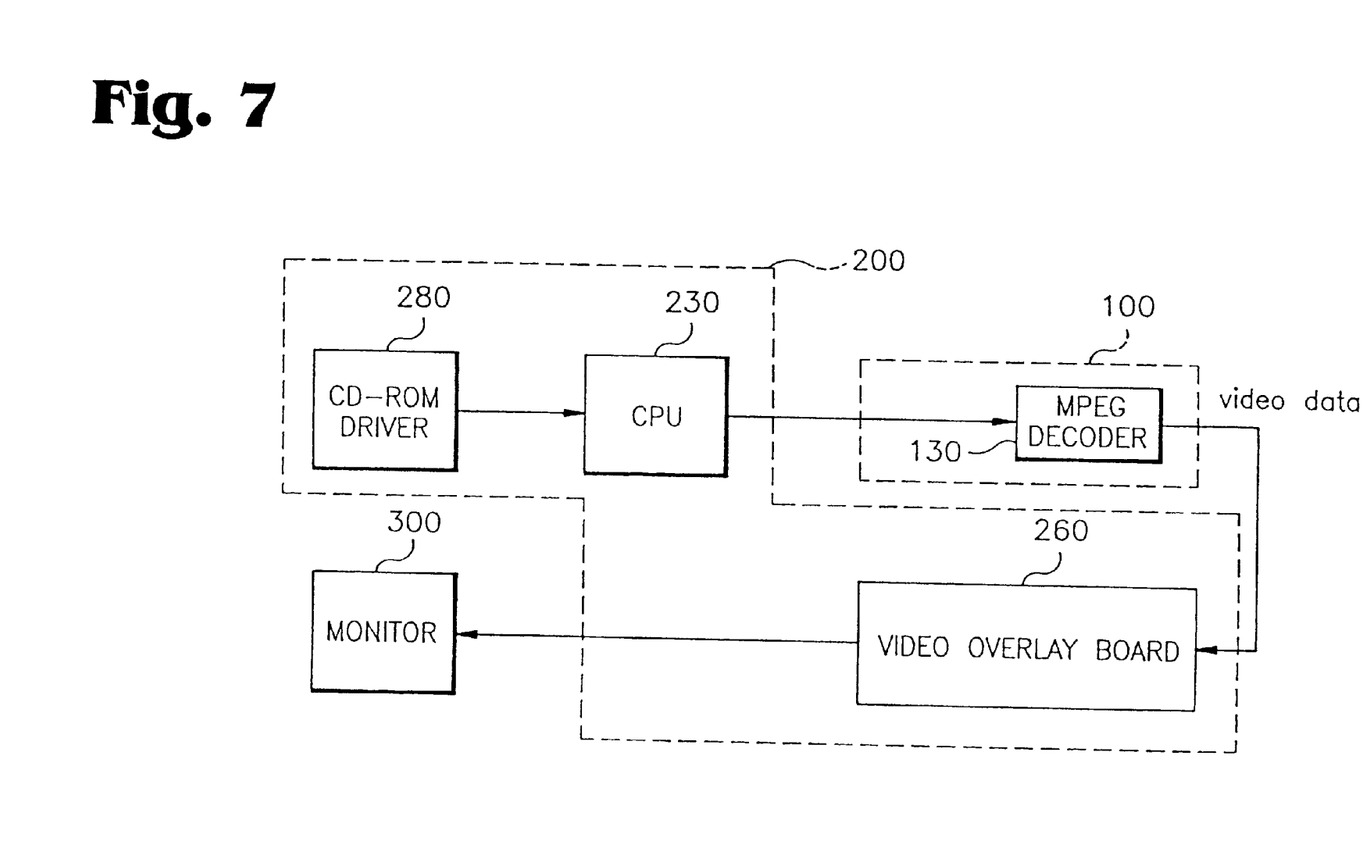
FIG. 7 shows a schematic diagram of the set top board 100 of the present invention when a video CD is to be operated.

FIG. 7 shows a schematic diagram of the set top board 100 of the present invention when a video CD is to be operated. In video CD operation, the CPU 230 of the PC 200 sends the reset signal RESET(PC) to the PC interface 150 of the set top board 100. As a result, only the MPEG decoder 130 is reset by the reset signal RESET(STB) transferred from the OR gate 153 of the PC interface 150, and the other components of the set top board are set to a power off state. As a result, the MPEG decoder 130 within the set top board 100 can interface with the PC 200 by the PC interface 150, and enables the video CD operation. By software, such as an application for the Windows operating system, the video CD of the CD-ROM driver 280 mounted in the PC 200 reads MPEG data and sends it to the MPEG decoder 130 of the set top board 100.

The set top board 100 recovers the compressed image data by the MPEG decoder 130, and transfers it to the video overlay board 260 and to the audio board 270 of the PC 200. The video overlay board 260 of the PC 20 processes, by a digital/analog converter thereof the digital video data and converts into it analog video data, and the converted analog video data is displayed on the monitor 300. The audio data is output by the speaker 250 via the audio board 270. Users can look and listen to the video CD through the monitor and the speaker.

In the video CD operation, only the MPEG decoder 130 is reset among the components of the set top board, and the other components are powered off. The reason is that if all of the components of the set top board are enabled in the video CD operation, the MPEG 130 is under the control not of the CPU 110 within the set top board 100 but of the CPU 230 of the PC 200.

Figure 8:
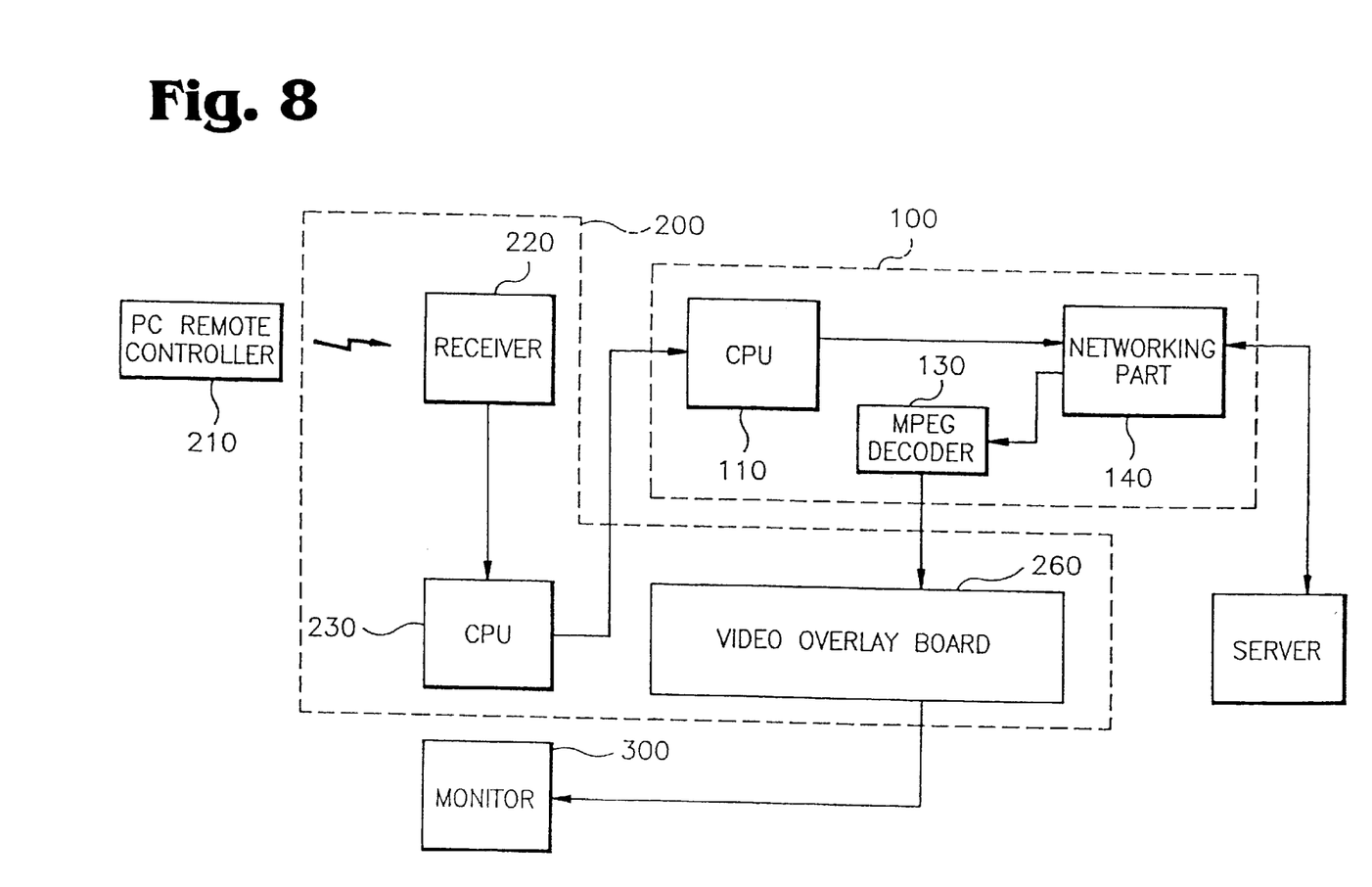
FIG. 8 is a schematic block diagram of the PC 200 mounting the set top board 100 when the VOD program is to be serviced.

FIG. 8 is a schematic block diagram of the PC 200 mounting the set top board 100 when the VOD program is to be serviced. When the VOD function is to be operated, the reset signal RESET(STB) which is out from the PC interface 150 of the set top board 100 by the CPU 230 of the PC 200 initializes the CPU 110, T1 networking part 140 and the MPEG decoder 130 of the set top board 100. In VOD operation, data transfer is bidirectional between the set top board 100 and the VOD server.

When a user sends a message to the PC through a PC remote controller 210, the CPU 230 receives this message through the remote controller signal receiver 220 of the PC 200 and transfers it to the CPU 110 of the set top board 100. The CPU 110 of the set top board 100 is connected to the VOD server via the T1 networking part 140, enabling the interaction between the personal computer and the VOD server. Items for the VOD service programs are displayed on the computer monitor 300 which are transferred through the T1 networking part 140 provided in the set top board 100, and subscribers or users can choose an item which they want to look at and listen to by means of the PC remote controller 210. When the chosen item is transmitted to the server through the T1 networking part 140 of the set top board 100, the server re-transfers the compressed image data in accordance with the selected service item to the set top board 100 via the T1 networking part 140. The MPEG decoder 130 of the set top board 100 recovers the compressed image data and sends it to the video overlay board 260 and the audio board 270 of the computer 200. Digital video data is converted to analog picture data by the digital/analog converter in the video overlay board 260, and then displayed on the computer monitor 300.

FIG. 9 shows an example of the set top board according to the present invention which is mounted in a slot of a personal computer. Referring to FIG. 9, the CPU 230 is mounted on a motherboard 200a which receives a user's command message from the PC remote controller 210 by using the PC receiver 220. In a plurality of slots 290, the video overlay board 260, overlay part 270, and the communication card 280 are mounted. One of the slots 290 is for mounting the set top board 100 according to the present invention used for VOD service.

As explained above, the set top board is mounted within the personal computer system rather than mounted in an additional device to the TV receiver so that the set top board can be controlled by the reset signal provided by the CPU of the PC, and a simpler set top board can be used.

The invention has been described in sufficient detail that it can be practiced by a person of ordinary skill in the art. When such a person reads the foregoing description, alternatives and equivalents, within the spirit and intent of the invention, will be apparent. Accordingly, it is intended that the scope of the invention be limited only by the following claims.

What is claimed is:

1. A set top board which is used in a video on demand (VOD) service system providing a plurality of compressed motion picture experts group (MPEG) image data programs and which is disposed within a personal computer provided with a central processing unit (CPU) for controlling the personal computer, a plurality of slots for mounting a number of functional cards, a display for displaying video signals, and a speaker for outputting audio signals, said set top board comprising:

a networking means for communicating with a service provider of the VOD service system;

an interface for interfacing with the CPU of the personal computer so that said set top board can be controlled by control signals of the personal computer;

a decoder for decoding the compressed MPEG image data; and a video processor for processing and outputting items corresponding to the compressed MPEG image data programs as still images on the display of the personal computer;

the interface comprising:

a first register for setting a least significant bit thereof to a predetermined value, when the clock signal is incoming from the bus control logic and when the reset signal is incoming from the personal computer, and for outputting control signals through a plurality of bits thereof by receiving data from the personal computer;

a second register for outputting status signals through a plurality of output bits by receiving the clock signal from the bus control logic and data from the data bus of the personal computer; and a logic circuit for receiving the least significant bit of the first register and then reset signal from the personal computer, and for outputting a reset signal used in the control of the set top board.

2. The set top board as claimed in claim 1, the set top board comprising a card which is plugged into one of the plurality of slots of the personal computer.

3. The set top board as claimed in claim 1, the control signals of the personal computer comprising a reset signal.

4. The set top board as claimed in claim 1, the set top board being reset or enabled by a software program of the personal computer, and checking out status bits by receiving data from data bus of the personal computer so as to interface with the personal computer.

5. A set top board which is disposed within a personal computer, and is applied to a VOD service system providing a plurality of compressed MPEG image data programs, said set top board comprising:

a CPU for controlling an operation of the set top board;

a networking part for communicating with a VOD service provider;

a video processor for processing lists corresponding the compressed image data programs transmitted from the VOD service provider via the networking part into a still image;

an MPEG decoder for decoding and recovering the compressed image data corresponding to a predetermined VOD program;

a PC interface for receiving a clock signal from a bus control logic and reset signal from the personal computer, and for sending another reset signal used for enabling a predetermined components to operate with a CPU of the set top board, said networking part, said video processor, and said MPEG decoder;

a video adapter for outputting video signals contained in the decoded data by said MPEG decoder to the personal computer; and an audio adapter for outputting audio signals contained in the decoded data by said MPEG decoder to the personal compute;

the PC interface comprising:

a first register for setting a least significant bit thereof to a predetermined value, when the clock signal is incoming from the bus control logic and when the reset signal is incoming from the personal computer, and for outputting control signals through a plurality of bits thereof by receiving data from the personal computer;

a second register for outputting status signals through a plurality of output bits by receiving the clock signal from the bus control logic and data from the data bus of the personal computer; and a logic circuit for receiving the least significant bit of the first register and the reset signal from the personal computer, and for outputting a reset signal used in the control of the set top board.

6. The set top board as claimed in claim 5, said bus control logic comprising ISA control logic, and said logic circuit comprising an OR gate.

7. A computer system comprising:

a first CPU for controlling operations of the computer system, via a PC remote controller signal receiver, by receiving messages sent from user of the computer system by a PC remote controller;

a motherboard including a number of slots and bus control logic, said first CPU being also mounted thereon;

a second CPU for controlling operations of a set top board;

a networking part for communicating with a VOD service provider;

a video processor for processing lists corresponding the compressed image data programs transmitted form VOD service provider via the networking part into a still image;

an MPEG decoder for decoding and recovering the compressed image data corresponding to a predetermined VOD program;

a PC interface comprising: a first register for setting a least significant bit thereof to a predetermined value, when the clock signal is incoming from the bus control logic and when the reset signal is incoming from the personal computer, and for outputting control signals through a plurality of bits thereof by receiving data from the personal computer; a second register for outputting status signals through a plurality of output bits by receiving the clock signal from the bus control logic and data from the data bus of the personal computer, and a logic circuit receiving the least significant bit of the first register and the reset signal from the personal computer, and for outputting a reset signal used in the control of the set top board;

a video adapter for outputting video signals contained in the decoded data by said MPEG decoder to the first CPU;

an audio adapter for outputting audio signals contained in the decoded data by said MPEG decoder to the second CPU;

a set top board for selectively performing a VOD function by interfacing the computer system with a VOD provider or a video CD function, said set top board being mounted in one of the number of slots and being controlled by control signals transferred from the CPU;

a video/audio signal processor for manipulating video signals and audio signals out of the set top board; and a display for displaying image data sent from the set top board via the video/audio signal processor.

8. The computer system as claimed in claim 7, said video/audio signal processor being in a form of a card, plugged into one of the number of slots.

* * * * *

UNITED STATES PATENT AND TRADEMARK OFFICE
CERTIFICATE OF CORRECTION

| | | |
|---|---|---|
| PATENT NO. | : 6,046,760 | Page 1 of 1 |
| APPLICATION NO. | : 08/852067 | |
| DATED | : April 4, 2000 | |
| INVENTOR(S) | : Dae-Hyun Jun | |

It is certified that error appears in the above-identified patent and that said Letters Patent is hereby corrected as shown below:

In the Specification
In Column 1, Line 13;

Please correct: Serial No. "12807/1996"

to -- 14682/1996 --

Signed and Sealed this

Twenty-ninth Day of May, 2007

JON W. DUDAS
*Director of the United States Patent and Trademark Office*